(12) United States Patent
Watanabe (10) Patent No.: US 8,200,152 B2
(45) Date of Patent: Jun. 12, 2012

(54) SEMICONDUCTOR INTEGRATED CIRCUIT AND CONTACTLESS ELECTRONIC DEVICE USING THE SAME

(75) Inventor: Kazuki Watanabe, Hino (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 740 days.

(21) Appl. No.: 11/585,839

(22) Filed: Oct. 25, 2006

(65) Prior Publication Data

US 2007/0097725 A1 May 3, 2007

(30) Foreign Application Priority Data

Oct. 27, 2005 (JP) ................. 2005-312220

(51) Int. Cl.
*H04B 5/00* (2006.01)
(52) U.S. Cl. .......... 455/41.1; 455/130; 455/274; 365/96
(58) Field of Classification Search ................. 455/41.1, 455/130, 274; 365/96
See application file for complete search history.

(56) References Cited

U.S. PATENT DOCUMENTS

| | | | |
|---|---|---|---|
| 5,247,241 A | 9/1993 | Ueda | |
| 5,450,027 A * | 9/1995 | Gabara | 326/98 |
| 5,483,434 A | 1/1996 | Seesink | |
| 5,604,671 A | 2/1997 | Okamura | |
| 5,708,419 A * | 1/1998 | Isaacson et al. | 340/572.5 |
| 6,504,422 B1 | 1/2003 | Rader et al. | |
| 6,525,595 B2 | 2/2003 | Oku | |
| 6,707,335 B2 * | 3/2004 | Kawai et al. | 327/536 |
| 6,756,838 B1 * | 6/2004 | Wu et al. | 327/536 |
| 7,494,066 B2 | 2/2009 | Koyama et al. | |
| 2001/0034093 A1 * | 10/2001 | Matsuzaki et al. | 438/199 |
| 2002/0056865 A1 | 5/2002 | Sadayuki | |
| 2006/0027666 A1 * | 2/2006 | Glaser | 235/492 |
| 2006/0049866 A1 * | 3/2006 | Namekawa et al. | 327/536 |
| 2006/0290410 A1 * | 12/2006 | Saether | 327/536 |

FOREIGN PATENT DOCUMENTS

| | | |
|---|---|---|
| CN | 1630083 A | 6/2005 |
| EP | 0 732 682 A1 | 9/1996 |
| JP | 06 283667 A | 10/1994 |
| JP | 7-502879 | 3/1995 |
| JP | 2000-166220 | 6/2000 |
| JP | 2000-262043 | 9/2000 |
| JP | 2001-250393 | 9/2001 |

OTHER PUBLICATIONS

EPO Office Action dated May 11, 2010 received in counterpart European application.

* cited by examiner

*Primary Examiner* — Lana N Le
*Assistant Examiner* — Hsin-Chun Liao
(74) *Attorney, Agent, or Firm* — Miles & Stockbridge P.C.

(57) ABSTRACT

There is provided a semiconductor integrated circuit provided with a charge pump circuit of low power consumption, capable of maintaining an output voltage thereof at a predetermined voltage level without causing current consumption to undergo intermittent variation, and a contactless electronic device using the semiconductor integrated circuit. With respective charge pump circuit unit cells (charge/discharge circuits) making up the charge pump circuit, charge current/discharge current flowing to or from the capacitor, respectively, is controlled according to the output voltage of the charge pump circuit. Accordingly, the charge pump circuit can maintain the output voltage thereof at the predetermined voltage level without undergoing an intermittent action. The charge current and discharge current are supplied from power supply terminals of a power supply circuit, current control is executed by a transistor, and a voltage outputted according to the output voltage of the charge pump circuit is supplied to the gate of the transistor.

20 Claims, 6 Drawing Sheets

SEMICONDUCTOR INTEGRATED CIRCUIT AND CONTACTLESS ELECTRONIC DEVICE USING THE SAME

CLAIM OF PRIORITY

The present patent application claims priority from Japanese application JP 2005-312220 filed on Oct. 27, 2005, the content of which is hereby incorporated by reference into this application.

FIELD OF THE INVENTION

The present invention relates to a power supply circuit technology suitable for application to a semiconductor integrated circuit, and in particular, to a semiconductor integrated circuit with a charge pump circuit mounted thereon, the charge pump circuit being a circuit for generating a power supply voltage from electromagnetic waves received by an antenna to thereby generate a high voltage from the power supply voltage, and a contactless electronic device using the semiconductor integrated circuit.

BACKGROUND OF THE INVENTION

In a charge pump circuit, boosting/lowering of voltage is generally executed by charging a capacitor through switching. In Patent Document 1 (Japanese Patent Laid-open 2000-262043), there has been disclosed an example of a constant voltage circuit provided with an autonomous adjusting system by which an output voltage of the charge pump circuit is fed back to a power supply voltage of an inverter responsible for a booster action in the charge pump circuit via an output voltage detector and a boosted voltage controller.

Further, in Patent Document 2 (Japanese Patent Laid-open 2000-166220), there has been disclosed an example of a power supply circuit in a charge pump circuit having a booster for generating a high voltage upon receiving a booster clock signal, the power supply circuit being provided with a boosting controller for generating the booster clock signal by comparing an output voltage of the booster with a predetermined voltage. With this example, the output voltage is optionally set, and in order to keep the output voltage at a given level, feeding/stopping of the booster clock signal is executed by the boosting controller.

SUMMARY OF THE INVENTION

A contactless electronic device (hereinafter referred to as "a contactless IC card") without a power supply such as a battery, and so forth, operating by generating power supply voltage from electromagnetic waves received through an antenna, has been putting to much use in various sectors of business such as transportation, finance, and so forth. The contactless IC card receives data transmitted from an interrogator by modulating the electromagnetic waves, and further, executes signal processing on the data as received to thereby obtain transmit data. The contactless IC card causes a load between terminals of the antenna to change according to the transmit data as obtained. As a result, the electromagnetic waves received by the antenna are modulated by the transmit data to be then transmitted to the interrogator. The interrogator receives the transmit data by detecting variation in reflection of the electromagnetic waves as transmitted.

Further, as the contactless IC card needs to have functions including a function for holding data as necessary, a nonvolatile memory such as an EEPROM (Electrically Erasable and Programmable ROM) is mounted thereon.

For example, as the EEPROM makes use of a high voltage for erasing and writing data, the EEPROM requires a charge pump circuit for generating a high voltage from a power supply voltage as supplied. In this connection, in order to ensure sufficient data-maintain properties of the EEPROM, it is necessary to maintain an output voltage of the charge pump circuit at a predetermined voltage level. Further, the charge pump circuit needs to be operable at low power consumption so that the same can be operated by limited power generated from the electromagnetic waves as received. In addition, the charge pump circuit needs to be suitable for semiconductor integration.

Next, as described above, with the contactless IC card, the data is transmitted to the interrogator by causing current flowing in the antenna to undergo a change. If the charge pump circuit repeats an intermittent action at this point in time by executing the feeding/stopping of the booster clock signal in order to keep the power supply voltage at a given level, as described in the Patent Document 2, this will cause current consumption in the charge pump circuit to undergo variation accompanying an intermittent cycle.

Consequently, if the intermittent cycle of the charge pump circuit falls within a frequency range detectable by the interrogator, and current variation is greater in magnitude than that detectable by the interrogator, this will cause the interrogator to erroneously recognize the current consumption in the charge pump circuit as the data transmitted from the contactless IC card.

The constant voltage circuit described in the Patent Document 1 has features in that since a voltage is kept constant by feedback (autonomous adjusting), the intermittent action can be avoided, and a component having difficulty with integration, such as a Zener diode, can be dispensed with. However, on the other hand, because all the power supply voltage of the inverter is supplied from the boosted voltage controller, there is no choice but to increase a drive capacity of the boosted voltage controller, so that an increase in power consumption is unavoidable.

It is therefore an object of the invention to provide a semiconductor integrated circuit provided with a charge pump circuit of low power consumption, capable of maintaining an output voltage thereof at a predetermined voltage level without causing current consumption to undergo intermittent variation, and a contactless electronic device using the semiconductor integrated circuit.

A representative embodiment of the invention disclosed in the present application is broadly and simply described as follows. More specifically, the invention provides a semiconductor integrated circuit, and a contactless electronic device using the same, the semiconductor integrated circuit including a power supply circuit for generating a DC voltage by rectifying and smoothing an AC signal supplied from an antenna, a charge pump circuit operated by the DC voltage generated by the power supply circuit, and a voltage detector for outputting a voltage according to an output voltage of the charge pump circuit, wherein the charge pump circuit has plural charge/discharge circuits successively connected to each other by connecting respective output terminals thereof in preceding stages with respective input terminals thereof in succeeding stages, the plurality of the charge/discharge circuits each has a capacitor, thereby executing charge/discharge to or from the capacitor, and a charge current/discharge current flowing to or from the capacitor is controlled according to an output voltage of the voltage detector, and thereby the output voltage of the charge pump circuit is maintained at a predetermined voltage. Because feedback is provided by control of the output voltage of the voltage detector, the semiconductor integrated circuit can maintain its output voltage constant without undergoing an intermittent action. Further, since charging of the capacitor is executed from the power supply circuit, and charge current/discharge current, flowing to, or from the capacitor, is controlled according to the output voltage of the voltage detector, it is possible to lighten a load on the voltage detector, thereby enabling the voltage detector to be lower in power consumption.

Thus, with the invention, the output voltage of the charge pump circuit can be maintained at the predetermined voltage without causing current consumption of the charge pump circuit to undergo intermittent variation, thereby enabling power consumption to be kept low.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Embodiments of a semiconductor integrated circuit according to the invention, and a contactless electronic device using the same are described in more detail hereinafter with reference to the accompanying drawings.
[Embodiment 1]

Figure 1:
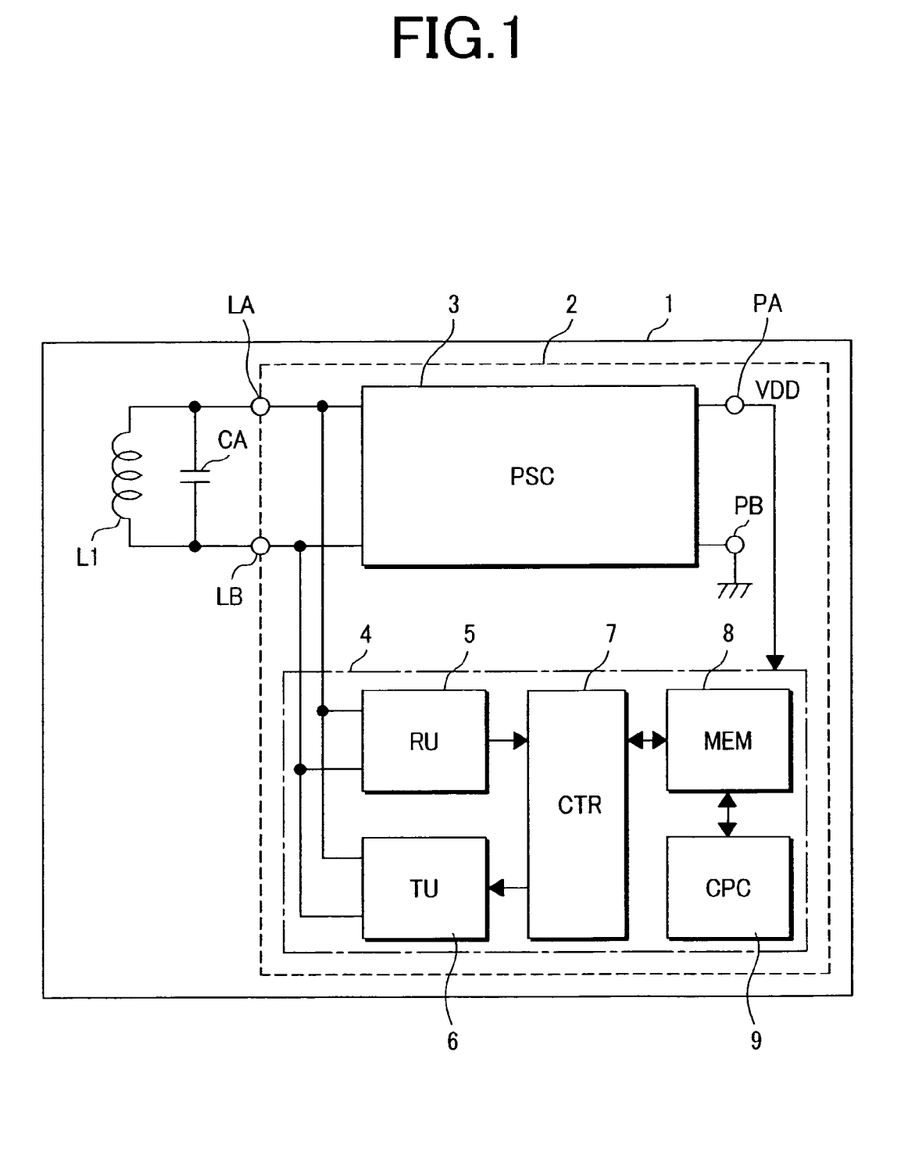
FIG. 1 is a block diagram for describing Embodiment 1 of a semiconductor integrated circuit according to the invention, and a contactless electronic device using the same.

FIG. 1 is a block diagram showing a basic configuration of Embodiment 1 of a semiconductor integrated circuit according to the invention, and a contactless IC card (a contactless electronic device) using the same.

In FIG. 1, reference numeral 1 denotes a contactless IC card, 2 a semiconductor integrated circuit mounted on the contactless IC card 1, and L1 an antenna mounted on the contactless IC card 1. The antenna L1 and a capacitor CA connected therewith in parallel make up a resonance circuit. The capacitor CA is not necessarily connected because adjustment is made by taking into account parasitic capacitance, and so forth. The semiconductor integrated circuit 2 includes a power supply circuit (PSC) 3 having power supply terminals PA, and PB, an internal circuit 4, and antenna terminals LA, and LB for connecting the antenna L1 therewith.

Figure 2:
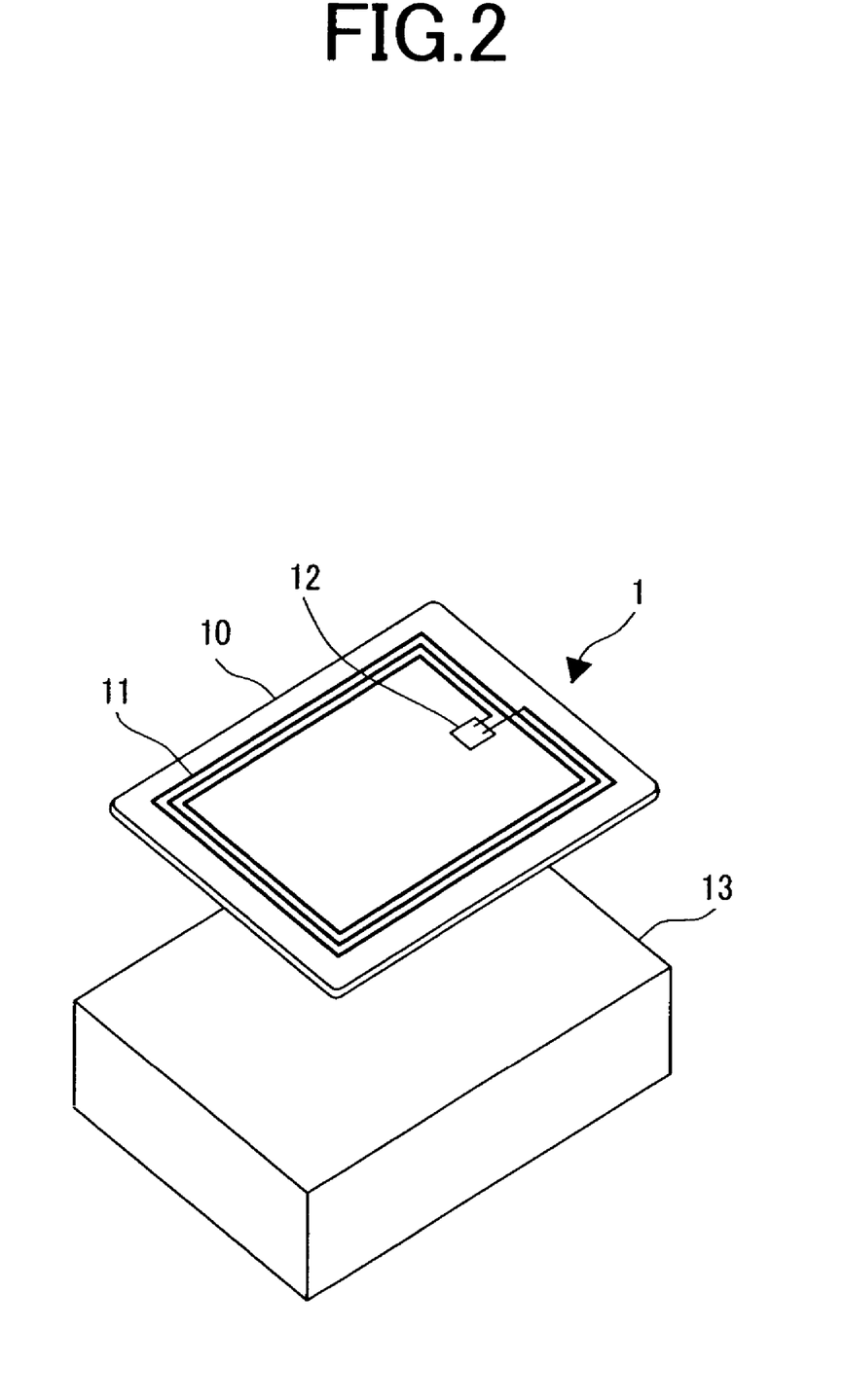
FIG. 2 is a perspective view showing the contactless electronic device according to the invention.

FIG. 2 shows a structure of the contactless IC 1. The contactless IC 1 is formed in the shape of a card by a printed wiring board 10 that is resin-molded. The antenna L1 for receiving electromagnetic waves from an interrogator 13 externally located is made up of a spiral coil 11 formed of a metal interconnection of the printed wiring board 10. The semiconductor integrated circuit 2 is formed as an IC chip 12 on one piece of semiconductor substrate made of material such as monocrystal silicon by the known technology for manufacturing a semiconductor integrated circuit although a method for manufacturing the same is not particularly limited thereto. Thus, one piece of the IC chip 12 that is the semiconductor integrated circuit 2 is mounted on the printed wiring board 10, and the coil 11 to serve as the antenna L1 is connected to the IC chip 12.

The antenna L1 having received the electromagnetic waves from the interrogator 13 outputs a high frequency AC signal to the antenna terminals LA, and LB, respectively. The AC signal has been modulated by an information signal (data) during a specified time period.

The present invention is typically applied to the contactless IC card that is a contactless electronic device, having no terminal on the surface thereof, for input from, or output to the outside, however, the present invention is obviously applicable to a dual type IC card having terminals for input and output, besides a contactless interface.

Further, the IC chip 12 that is the semiconductor integrated circuit 2 is formed on one piece of the semiconductor substrate made of the material such as monocrystal silicon by the known technology for manufacturing a semiconductor integrated circuit although a method for manufacturing the same is not particularly limited thereto.

In FIG. 1, the power supply circuit 3 is made up of a rectifier and a smoothing capacitor. Needless to say, the power supply circuit 3 may be provided with a regulator function for controlling an output voltage VDD thereof so as not to exceed a predetermined voltage level.

The voltage VDD outputted by the power supply circuit 3 from the power supply terminals thereof, PA, and PB, respectively, is fed to the internal circuit 4 as a power supply voltage thereof, VDD. The internal circuit 4 includes a receiver (RU) 5, a transmitter (TU) 6, a controller (CTR) 7, a memory (MEM) 8, and a charge pump circuit (CPC) 9. The receiver demodulates the information signal superimposed on the AC signal received by the antenna L1 provided on the contactless IC card 1, and supplies the controller 7 with a receive signal that is the digital information signal as obtained.

The transmitter 6 receives a transmit signal that is the digital information signal outputted from the controller 7 to thereby modulate the AC signal received by the antenna L1 with the transmit signal. The interrogator 13 detects variation in reflection of the electromagnetic waves from the antenna L1, thereby receiving the transmit signal sent out from the controller 7.

The memory 8 is utilized for recording and so forth of demodulated information data and transmission data, relating to controller 7. The charge pump circuit 9 generates a negative voltage and a high voltage from the power supply voltage. The high voltage generated is used for recording and so forth of, for example, data by the memory 8, however, there is no particular limitation to application purposes thereof.

Figure 3:
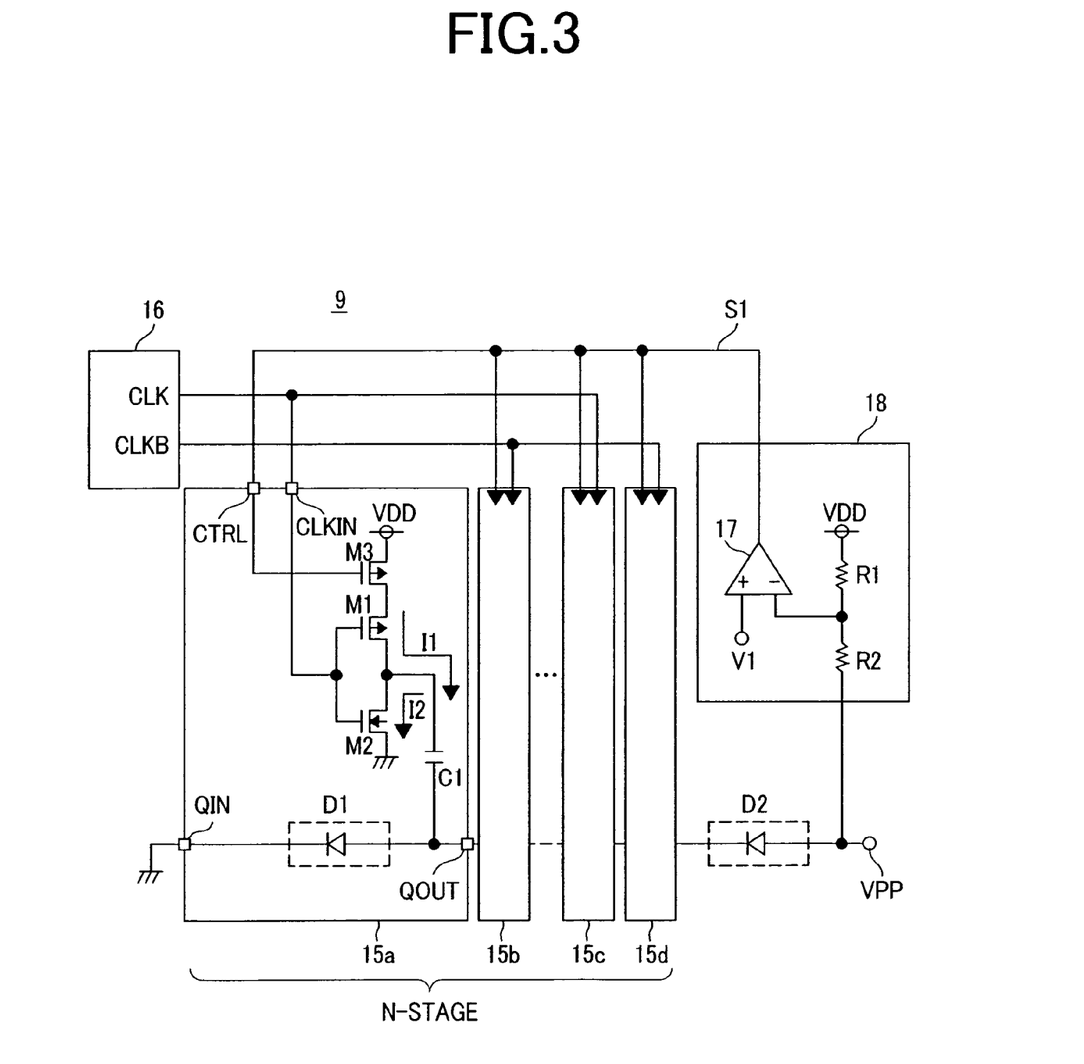
FIG. 3 is a circuit diagram showing an example of a charge pump circuit mounted on the semiconductor integrated circuit according to Embodiment 1.

FIG. 3 is a circuit diagram showing an example of the charge pump circuit 9 mounted on the semiconductor integrated circuit according to the present embodiment. In FIG. 3, the charge pump circuit 9 includes n-stages of the charge pump circuit unit cells (charge/discharge circuits) 15a, 15b, 15c, 15d, and a unidirectional element D2, and a clock signal CLK, or a clock signal CLKB corresponding to the clock signal CLK as inverted, outputted from a clock generation circuit 16, is fed to respective clock input terminals CLKIN of all the charge pump circuit unit cells 15.

The charge pump circuit unit cells 15 each include an inverter having a PMOS (Metal Oxide Semiconductor) transistor M1, and an NMOS transistor M2, and a PMOS transistor M3 having a gate terminal to which a control terminal CTRL is connected. The transistor M3, and the inverter are connected in series between the one power supply terminal PA and the other power supply terminal PB. The inverter drives a capacitor C1 coupled between a charge output terminal QOUT of the charge pump circuit unit cell 15 and an output terminal of the inverter by the agency of the clock signal fed to the clock input terminal CLKIN. In this case, the clock signal is fed from the clock generation circuit 16 to the clock input terminal CLKIN. Further, a unidirectional element D1 is inserted between a charge input terminal QIN of the charge pump circuit unit cell 15 and the charge output terminal QOUT thereof.

In FIG. 3, the unidirectional elements D1, D2 are each made up of a diode, however, there is no limitation thereto, and the unidirectional elements D1, D2 each may be made up of, for example, a MOS transistor a gate voltage of which is controlled by a gate voltage controlled circuit to thereby execute an on/off action. Further, with series-connection between the transistor M1 and the transistor M3, the transistor M1 may be connected to a side of the power supply, while the transistor M3 may be connected to a side of the transistor M2.

An output signal S1 of a voltage detector 18 made up of an operational amplifier 17 and resistors R1, R2 is inputted to the control terminal CTRL of the charge pump circuit unit cell 15. The output signal S1 is a voltage signal outputted according to an output voltage Vout of the charge pump circuit 9 after comparing a voltage obtained by dividing the output voltage Vout at an output terminal VPP of the charge pump circuit 9 by use of the resistors R1, R2 with a reference voltage V1.

In the case of the clock input terminal CLKIN being at "L", the transistor M1 is turned ON, and the transistor M2 is turned OFF, so that current I1 flows via the transistors M3, M1 to thereby charge the capacitor C1. At this point in time, charge is supplied from the charge input terminal QIN via the unidirectional element D1. In the case of the clock input terminal CLKIN being at "H", the transistor M1 is turned OFF, and the transistor M2 is turned ON, so that current I2 flows via the transistor M2 to thereby discharge the capacitor C1. As the unidirectional element D1 is in the OFF state at this point in time, charge is outputted from the charge output terminal QOUT to the charge pump circuit unit cell in a succeeding stage. Thus, the inverter and the transistor M3 function as a switching circuit for executing a switching action to couple one of terminals of the capacitor C1 to the power supply terminal PA via the transistors M3, or to connect the same to the power supply terminal PB.

Since the clock signal is fed to the clock input terminal CLKIN, the above-described action is repeated, and supply of the charge to the charge pump circuit unit cells in respective succeeding stages is continued. The clock signals fed to the charge pump circuit unit cells in a preceding stage and a stage succeeding thereto, respectively, are the clock signal CLK, and the clock signal CLKB, respectively, inverted in phase from each other, so that if a charge action is executed in the preceding stage, a discharge action is executed in the stage succeeding thereto, and conversely, if the discharge action is executed in the preceding stage, the charge action is executed in the stage succeeding thereto. By so doing, while charge supplied to the capacitor C1 is added up backward in the n-stages of the charge pump circuit unit cells, ultimate charge is supplied to the output terminal VPP via the unidirectional element D2, thereby enabling a negative voltage to be generated.

Meanwhile, because the output signal S1 undergoes a change according to a voltage level at the output terminal VPP, the current flowing through the transistor M3 undergoes a change upon input of the output signal S1 to the control terminal CTRL. The current flowing through the transistor M3 is controlled so as to be decreased upon the output voltage Vout reaching a predetermined voltage level. By so doing, charge to be stored in the capacitor C1 is checked, so that charge to be outputted to the succeeding stage can be checked.

Figure 4:
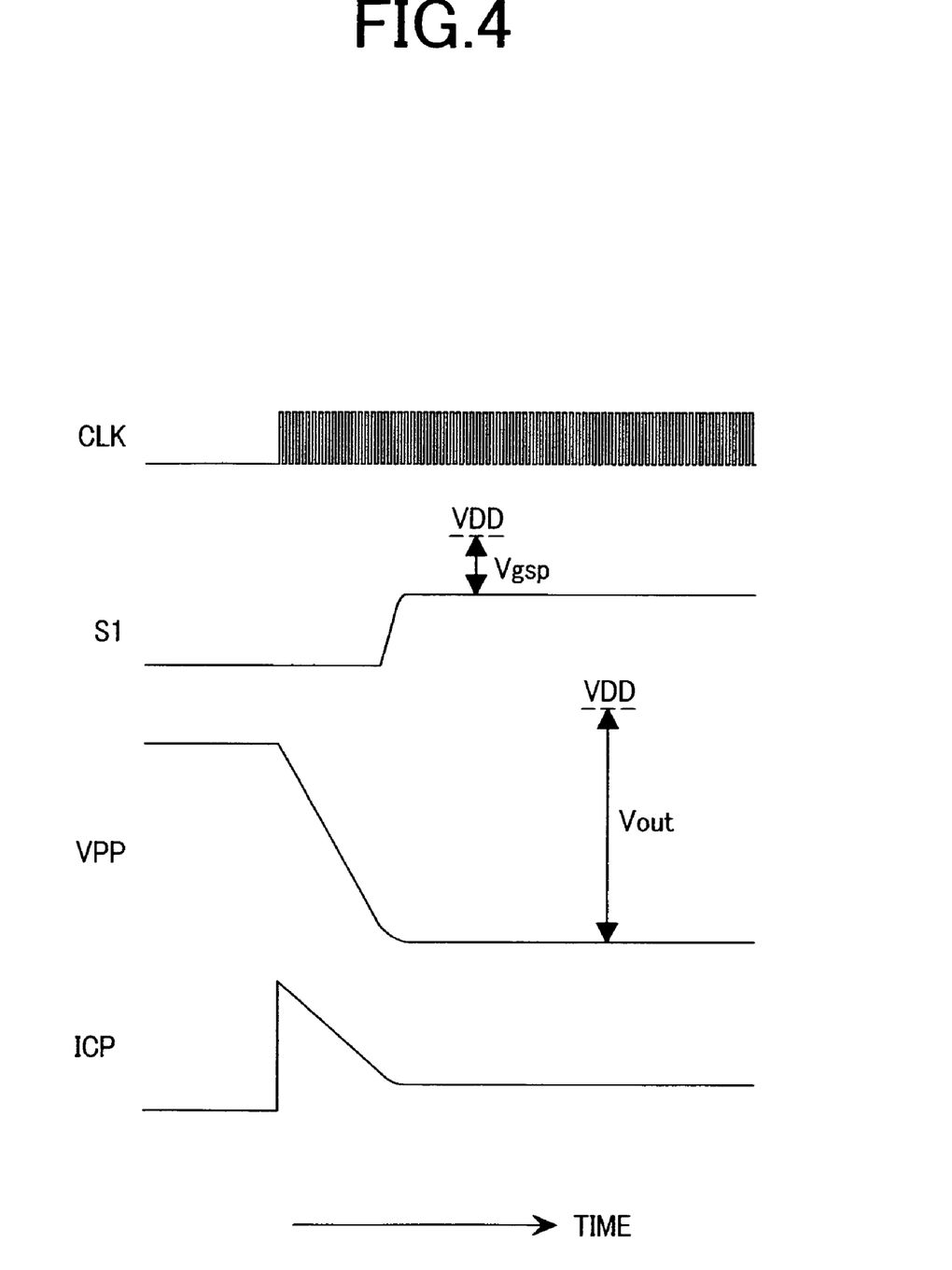
FIG. 4 is a view showing an example of operating waveforms of the charge pump circuit shown in FIG. 3.

In FIG. 4, there is shown an example of operating waveforms of the charge pump circuit 9 shown in FIG. 3. As shown FIG. 4, the above-described action is repeated every time the clock signal CLK is fed to the charge pump circuit 9, thereby causing the output voltage Vout to fall. The output signal S1 of the voltage detector 18 keeps outputting at a ground voltage level until the output voltage Vout of the charge pump circuit 9 reaches the predetermined voltage level. As a result, the transistor M3 of the charge pump circuit unit cell 15, the transistor M3 being of a P-channel type, is turned ON, whereupon the charge pump circuit 9 causes the output voltage thereof to fall at the maximum capacity.

Thereafter, upon the output voltage Vout of the charge pump circuit 9 reaching the predetermined voltage level, the output signal S1 of the voltage detector 18 rises in level, thereby providing feedback such that there occurs a decrease in a gate-to-source voltage Vgsp of the P-channel transistor M3 of the charge pump circuit unit cell 15. Consequently, the current flowing through the transistor M3 is decreased, thereby checking the current I1 for charging the capacitor C1. As a result, charge outputted from the charge pump circuit 9 via the unidirectional element D2 is checked, so that the output voltage Vout of the charge pump circuit 9 is maintained at the predetermined voltage level.

The output voltage Vout of the charge pump circuit 9 can be maintained at the predetermined voltage level because the current flowing through the transistor M3 of the charge pump circuit unit cell 15 is controlled as a result of the above-described action. Consequently, the charge pump circuit 9 is prevented from making an intermittent action, so that current consumption ICP of the charge pump circuit 9 will not undergo intermittent variation. Further, since control of the output voltage Vout of the charge pump circuit 9 is effected to the gate of the transistor M3, it is possible to lower a drive capacity of the operational amplifier 17, and accordingly, a circuit low in power consumption can be adopted for the operational amplifier 17, thereby enabling power consumption of the charge pump circuit 9 to be reduced.

[Embodiment 2]

Figure 5:
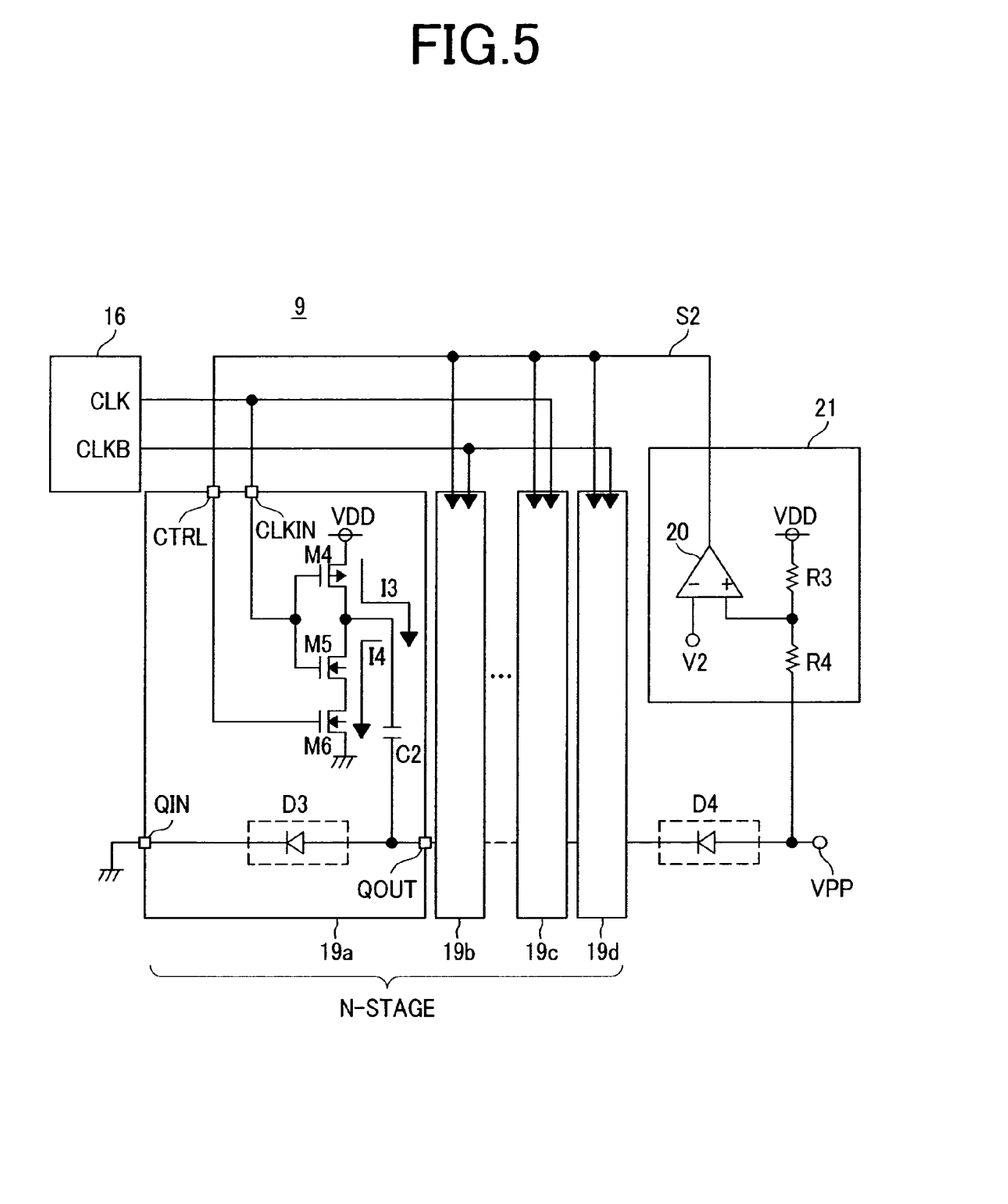
FIG. 5 is a circuit diagram of a charge pump circuit, for describing Embodiment 2 of a semiconductor integrated circuit according to the invention.

FIG. 5 is a circuit diagram showing another configuration of a charge pump circuit 9 mounted on a semiconductor integrated circuit according to Embodiment 2 of the invention. In FIG. 5, the charge pump circuit 9 includes N-stages of charge pump circuit unit cells 19a, 19b, 19c, 19d, and a unidirectional element D4, and a clock signal CLK, or a clock signal CLKB corresponding to the clock signal CLK as inverted, outputted from a clock generation circuit 16, is fed to respective clock input terminals CLKIN of all the charge pump circuit unit cells 19.

The charge pump circuit unit cells 19 each include an inverter made up of a PMOS (Metal Oxide Semiconductor) transistor M4, and an NMOS transistor M5, and an NMOS transistor M6 having a gate terminal to which a control terminal CTRL is connected. The transistor M6, and the inverter are connected in series between the one power supply terminal PA and the other power supply terminal PB. The inverter drives a capacitor C2 coupled between a charge output terminal QOUT of the charge pump circuit unit cell 19 and an output terminal of the inverter by the agency of the clock signal fed to the clock input terminal CLKIN. In this case, the clock signal is fed from a clock generation circuit 16 to the clock input terminal CLKIN. Further, a unidirectional element D3 is inserted between a charge input terminal QIN of the charge pump circuit unit cell 19 and the charge output terminal QOUT thereof.

Now, in FIG. 5, the unidirectional elements D3, D4 are each made up of a diode, however, there is no limitation thereto, and the unidirectional elements D3, D4 each may be made up of, for example, a MOS transistor a gate voltage which is controlled by a gate voltage controlled circuit to thereby execute an on/off action. Further, with series-connection between the transistor M5 and the transistor M6, the transistor M5 may be connected to a side of the ground, while the transistor M6 may be connected to a side of the transistor M4.

An output signal S2 of the voltage detector 21 made up of an operational amplifier 20 and resistors R3, R4 is fed to the control terminal CTRL of the charge pump circuit unit cell 19. The output signal S2 is a voltage signal outputted according to an output voltage Vout of the charge pump circuit 9 after comparing a voltage obtained by dividing the output voltage Vout of the charge pump circuit 9 by use of the resistors R3 and R4 with a reference voltage V2.

In the case of the clock input terminal CLKIN being at "L", the transistor M4 is turned ON, and the transistor M5 is turned OFF, so that current I3 flows via the transistor M4 to thereby charge the capacitor C2. At this point in time, charge is supplied from the charge input terminal QIN via the unidirectional element D3. In the case of the clock input terminal CLKIN being at "H", the transistor M4 is turned OFF, and the transistor M5 is turned ON, so that current I4 flows via the transistors M5, M6 to thereby discharge the capacitor C2. As the unidirectional element D3 is in the OFF state at this point in time, charge is outputted from the charge output terminal QOUT to the charge pump circuit unit cell 19 in a succeeding stage. Thus, the inverter and the transistor M6 function as a switching circuit for executing a switching action to connect one of terminals of the capacitor C2 to the power supply terminal PA, or to couple the same to the power supply terminal PB via the transistors M6.

Since the clock signal is fed to the clock input terminal CLKIN, the above-described action is repeated, and supply of the charge to the charge pump circuit unit cells in respective succeeding stages is continued. The clock signals fed to the charge pump circuit unit cells in a preceding stage, and a stage succeeding thereto, respectively, are a clock signal CLK and a clock signal CLKB, respectively, inverted in phase from each other, so that if a charge action is executed in the preceding stage, a discharge action is executed in the stage succeeding thereto, and conversely, if the discharge action is executed in the preceding stage, the charge action is executed in the stage succeeding thereto. By so doing, while charge supplied to the capacitor C2 is added up backward in N-stages of the charge pump circuit unit cells, ultimate charge is supplied to the output terminal VPP via the unidirectional element D4, thereby enabling a negative voltage to be generated.

As described above, the output signal S2 undergoes a change according to a voltage level at the output terminal VPP, so that current flowing through the transistor M6 undergoes a change upon input of the output signal S2 to the control terminal CTRL. The current flowing through the transistor M6 is controlled so as to be decreased upon the output voltage Vout reaching a predetermined voltage level. By so doing, charge to be stored in the capacitor C2 is checked, so that charge to be outputted to the succeeding stage can be checked.

Figure 6:
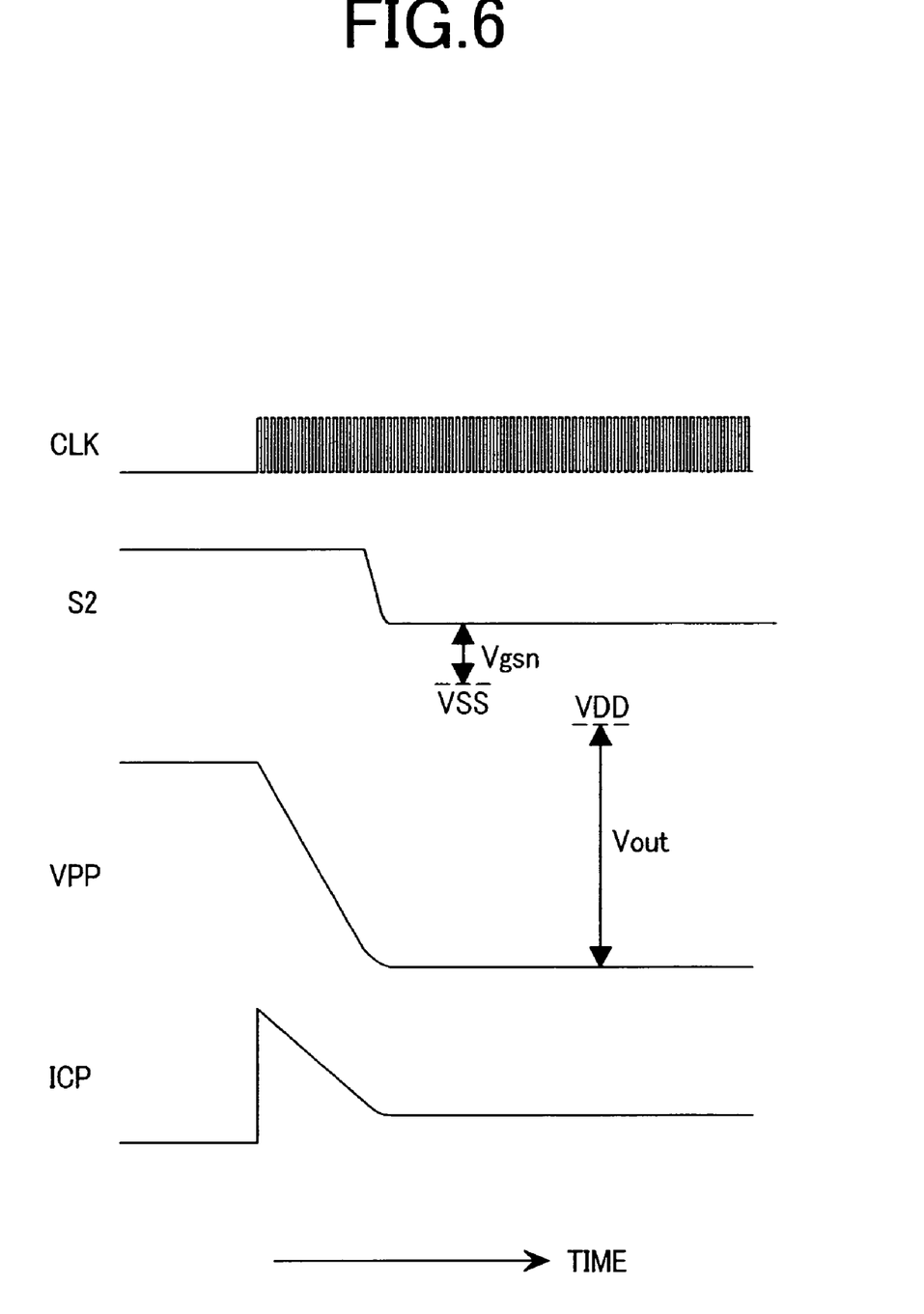
FIG. 6 is a view showing an example of operating waveforms of the charge pump circuit shown in FIG. 5.

In FIG. 6, there is shown a sample of operating waveforms of the charge pump circuit 9 shown in FIG. 5. As shown FIG. 6, the above-described action is repeated every time the clock signal CLK is fed to the charge pump circuit 9, thereby causing the output voltage Vout to fall. The output signal S2 of the voltage detector 21 keeps outputting at a level of the power supply voltage until the output voltage Vout of the charge pump circuit 9 reaches the predetermined voltage level. As a result, the transistor M6 of the charge pump circuit unit cell 19, the transistor M6 being of a N-channel type, is turned ON, and the charge pump circuit 9 causes the output voltage thereof to fall at the maximum capacity.

Thereafter, upon the output voltage Vout of the charge pump circuit 9 reaching the predetermined voltage level, the output signal S2 of the voltage detector 21 falls in level, thereby providing feedback such that there occurs a decrease in a gate-to-source voltage Vgsn of the N-channel transistor M6 of the charge pump circuit unit cell 19. Consequently, the current flowing through the transistor M6 is decreased, thereby checking the current 14 for discharging the capacitor C2. As a result, charge outputted from the charge pump circuit 9 via the unidirectional element D4 is checked, so that the output voltage Vout is maintained at the predetermined voltage level.

The output voltage Vout of the charge pump circuit 9 can be maintained at the predetermined voltage level by controlling the current flowing through the transistor M6 of the charge pump circuit unit cell 19 through the above-described action. Consequently, the charge pump circuit 9 is prevented from making an intermittent action, so that current consumption ICP of the charge pump circuit 9 will not undergo intermittent variation. Further, since control of the output voltage Vout of the charge pump circuit 9 is made against the gate of the transistor M6, it is possible to lower a drive capacity of the operational amplifier 20, and accordingly, a circuit low in power consumption can be adopted for the operational amplifier 20, thereby enabling lower power consumption of the charge pump circuit to be implemented.

In this case, as the NMOS transistor is greater in mobility than the PMOS transistor, the NMOS transistor M6 for controlling charge current to the capacitor C2 can be rendered smaller in transistor size, thereby reducing a chip area.

Having specifically described the invention with reference to the embodiments as described above, it is to be understood that the invention is not limited to those embodiments, and that obviously various changes and modifications may be made in the invention without departing from the spirit and scope thereof. For example, the charge pump circuits shown in FIG. 3, and FIG. 5, respectively, are made up so as to produce the negative voltage, however, with a charge pump circuit for generating a positive voltage, control can be similarly implemented. The charge pump circuit for generating the positive voltage is made up such that charge is provided from, for example, a ground side to thereby charge a capacitor, and subsequently, charge accumulated is released to a positive power supply side, whereupon the unidirectional element is in the OFF state, and the charge is outputted to the respective charge pump circuit unit cells, in successive stages.

What is claimed is:

1. A semiconductor integrated circuit comprising:
    a power supply circuit constructed to generate a DC voltage by rectifying and smoothing an AC signal supplied from an antenna;
    a charge pump circuit which is operated by the DC voltage generated by the power supply circuit;
    a clock generation circuit which generates a clock signal; and a voltage detector constructed to output a control voltage according to a difference between an output voltage of the charge pump circuit and a predetermined voltage, wherein the charge pump circuit includes a plurality of charge/discharge circuits successively connected to each other by respective output terminals of said plurality of charge/discharge circuits in preceding stages being connected with respective input terminals thereof in succeeding stages, wherein the charge pump circuit is constructed to repeat a voltage generation action using the clock signal fed from the clock generation circuit, wherein each said charge/discharge circuit has a capacitor and is configured to charge and discharge the capacitor, wherein each charge/discharge circuit comprises an inverter and a MOS transistor connected in series between power supply terminals of the power supply circuit, the capacitor being coupled between an output terminal of the inverter and an output terminal of the charge/discharge circuit, and a unidirectional element connected between an input terminal of the charge/discharge circuit and the output terminal thereof, wherein the control voltage is input to a gate terminal of the MOS transistor, wherein a charge current flowing to the capacitor is controlled according to the control voltage, wherein, as the clock signal is fed to the charge pump circuit, the control voltage is increased until a predetermined voltage level so as to continuously decrease the charge current flowing to the capacitor through the MOS transistor, and wherein the charge pump circuit is configured to check a charge output from an output voltage terminal of the charge pump circuit, and is further configured to maintain the output voltage of the charge pump circuit at the predetermined voltage by maintaining without interruption, at the charge pump circuit, the clock signal fed from the clock generation circuit when repeating the voltage generation action.

2. The semiconductor integrated circuit according to claim 1, wherein the clock signal is fed to an input terminal of the inverter, and the clock signals fed to each of the plurality of the charge/discharge circuits in the preceding stage and the succeeding stage adjacent thereto, respectively, are inverted in phase from each other, and wherein charge/discharge to or from the capacitor is executed by the inverter according to the clock signal.

3. The semiconductor integrated circuit according to claim 1, wherein the unidirectional element is a diode.

4. The semiconductor integrated circuit according to claim 1, wherein the unidirectional element is a MOS transistor, and an on/off action of the MOS transistor is controlled by a gate voltage thereof.

5. The semiconductor integrated circuit according to claim 1, wherein the voltage detector comprises a first resistor, a second resistor, and an operational amplifier, wherein a potential difference between the DC voltage generated by the power supply circuit and the output voltage of the charge pump circuit is divided by the first resistor and the second resistor, and wherein a voltage obtained by said dividing the potential difference is compared with a reference voltage by the operational amplifier which outputs the control voltage of the voltage detector in accordance therewith.

6. A contactless electronic device comprising:
a substrate;
a coil formed on the substrate, serving as an antenna; and
the semiconductor integrated circuit according to claim 1, connected to the coil, and mounted on the substrate.

7. The semiconductor integrated circuit according to claim 1, wherein the charge pump circuit is further configured to continuously decrease the charge current flowing to the capacitor on the charge pump action.

8. The semiconductor integrated circuit according to claim 1, wherein each time the clock signal is fed to the charge pump circuit, the control voltage is increased to a predetermined voltage level so as to continuously decrease the charge current flowing to the capacitor to a minimum level, the control voltage being maintained at the predetermined voltage level thereafter.

9. The semiconductor integrated circuit according to claim 1, wherein the control voltage from the voltage detector is supplied to a control input of the charge pump circuit.

10. A semiconductor integrated circuit comprising:
an antenna terminal connected to an antenna;
a power supply circuit constructed to generate a DC voltage by rectifying and smoothing an AC signal supplied from the antenna to the antenna terminal;
a charge pump circuit operated by the DC voltage generated by the power supply circuit;
a clock generation circuit which generates a clock signal;
a voltage detector constructed to output a control voltage according to a difference between an output voltage of the charge pump circuit and a predetermined voltage, wherein the charge pump circuit includes a plurality of charge/discharge circuits successively connected to each other by respective output terminals of said plurality of charge/discharge circuits in preceding stages being connected with respective input terminals thereof in succeeding stages, wherein the charge pump circuit is constructed to repeat a voltage generation action using the clock signal fed from the clock generation circuit, wherein each of the plurality of the charge/discharge circuits comprises
a capacitor into which a charge current flows in from one of a pair of power supply terminals which output the DC voltage, and from which a discharge current flows out to the other of the pair of power supply terminals;
a switching circuit for charging and discharging the capacitor according to the clock signal; and
a unidirectional element connecting an input terminal of the charge/discharge circuit to an output terminal thereof, wherein the switching circuit includes an inverter and a MOS transistor connected in series between one power supply terminal of the power supply circuit and the other power supply terminal, wherein the capacitor is coupled between an output terminal of the inverter and an output terminal of the charge/discharge circuit, wherein the clock signal is inputted to an input terminal of the inverter, wherein the control voltage is inputted to a gate terminal of the MOS transistor, wherein the charge current flowing to the capacitor is controlled according to the control voltage, wherein, as the clock signal is fed to the charge pump circuit, the control voltage is increased until a predetermined voltage level so as to continuously decrease the charge current flowing to the capacitor through the MOS transistor, and wherein the charge pump circuit is configured to check a charge output from an output voltage terminal of the charge pump circuit, and is further configured to maintain the output voltage of the charge pump circuit at the predetermined voltage by maintaining without interruption, at the charge pump circuit, the clock signal fed from the clock generation circuit when repeating the voltage generation action.

11. The semiconductor integrated circuit according to claim 10, wherein the unidirectional element is a diode.

12. The semiconductor integrated circuit according to claim 10, wherein the unidirectional element is a MOS transistor, and an on/off action of the MOS transistor is controlled by a gate voltage thereof.

13. The semiconductor integrated circuit according to claim 10, wherein the clock signals fed to each of the plurality of the charge/discharge circuits in the preceding stage and the succeeding stage adjacent thereto, respectively, are inverted in phase from each other.

14. The semiconductor integrated circuit according to claim 10, wherein the voltage detector comprises a first resistor, a second resistor, and an operational amplifier, wherein a potential difference between the DC voltage generated by the power supply circuit and the output voltage of the charge pump circuit is divided by the first resistor and the second resistor, and wherein a voltage obtained by said dividing the potential difference is compared with a reference voltage by the operational amplifier which outputs the control voltage of the voltage detector in accordance therewith.

15. A contactless electronic device comprising:
a substrate;
a coil formed on the substrate, serving as an antenna; and
the semiconductor integrated circuit according to claim 10, connected to the coil, and mounted on the substrate.

16. The semiconductor integrated circuit according to claim 10, wherein the charge pump circuit is further configured to continuously decrease the charge current flowing to the capacitor on the charge pump action.

17. The semiconductor integrated circuit according to claim 10, wherein each time the clock signal is fed to the charge pump circuit, the control voltage is increased to a predetermined voltage level so as to continuously decrease the charge current flowing to the capacitor to a minimum level, the control voltage being maintained at the predetermined voltage level thereafter.

18. The semiconductor integrated circuit according to claim 10, wherein the control voltage from the voltage detector is supplied to a control input of the charge pump circuit.

19. A semiconductor integrated circuit comprising:
a power supply circuit constructed to generate a DC voltage by rectifying and smoothing an AC signal supplied from an antenna;
a charge pump circuit which is operated by the DC voltage generated by the power supply circuit;
a clock generation circuit which generates a clock signal; and
a voltage detector constructed to output a control voltage according to a difference between an output voltage of the charge pump circuit and a predetermined voltage,
wherein the charge pump circuit includes a plurality of charge/discharge circuits successively connected to each other by respective output terminals of said plurality of charge/discharge circuits in preceding stages being connected with respective input terminals thereof in succeeding stages, wherein the charge pump circuit is constructed to repeat a voltage generation action using the clock signal fed from the clock generation circuit, wherein each said charge/discharge circuit has a capacitor and is configured to charge and discharge the capacitor, wherein each charge/discharge circuit comprises an inverter and a MOS transistor connected in series between power supply terminals of the power supply circuit, the capacitor being coupled between an output terminal of the inverter and an output terminal of the charge/discharge circuit, and a unidirectional element connected between an input terminal of the charge/discharge circuit and the output terminal thereof, wherein the control voltage is input to a gate terminal of the MOS transistor, wherein a charge current flowing to the capacitor is controlled according to the control voltage, and wherein the control voltage is supplied to a control input of the charge pump circuit.

20. A semiconductor integrated circuit comprising:
an antenna terminal connected to an antenna;
a power supply circuit constructed to generate a DC voltage by rectifying and smoothing an AC signal supplied from the antenna to the antenna terminal;
a charge pump circuit operated by the DC voltage generated by the power supply circuit;
a clock generation circuit which generates a clock signal;
a voltage detector constructed to output a control voltage according to a difference between an output voltage of the charge pump circuit and a predetermined voltage,
wherein the charge pump circuit includes a plurality of charge/discharge circuits successively connected to each other by respective output terminals of said plurality of charge/discharge circuits in preceding stages being connected with respective input terminals thereof in succeeding stages, wherein the charge pump circuit is constructed to repeat a voltage generation action using the clock signal fed from the clock generation circuit, wherein each of the plurality of the charge/discharge circuits comprises
a capacitor into which a charge current flows in from one of a pair of power supply terminals which output the DC voltage, and from which a discharge current flows out to the other of the pair of power supply terminals;
a switching circuit for charging and discharging the capacitor according to a clock signal; and
a unidirectional element connecting an input terminal of each of the charge/discharge circuit to an output terminal thereof, wherein the switching circuit includes an inverter and a MOS transistor connected in series between one power supply terminal of the power supply circuit and the other power supply terminal, wherein the capacitor is coupled between an output terminal of the inverter and an output terminal of the charge/discharge circuit, wherein the clock signal is inputted to an input terminal of the inverter, wherein the control voltage is inputted to a gate terminal of the MOS transistor, wherein a charge current flowing to the capacitor is controlled according to the control voltage, and wherein the control voltage is supplied to a control input of the charge pump circuit.

* * * * *